Figures 1, 2:
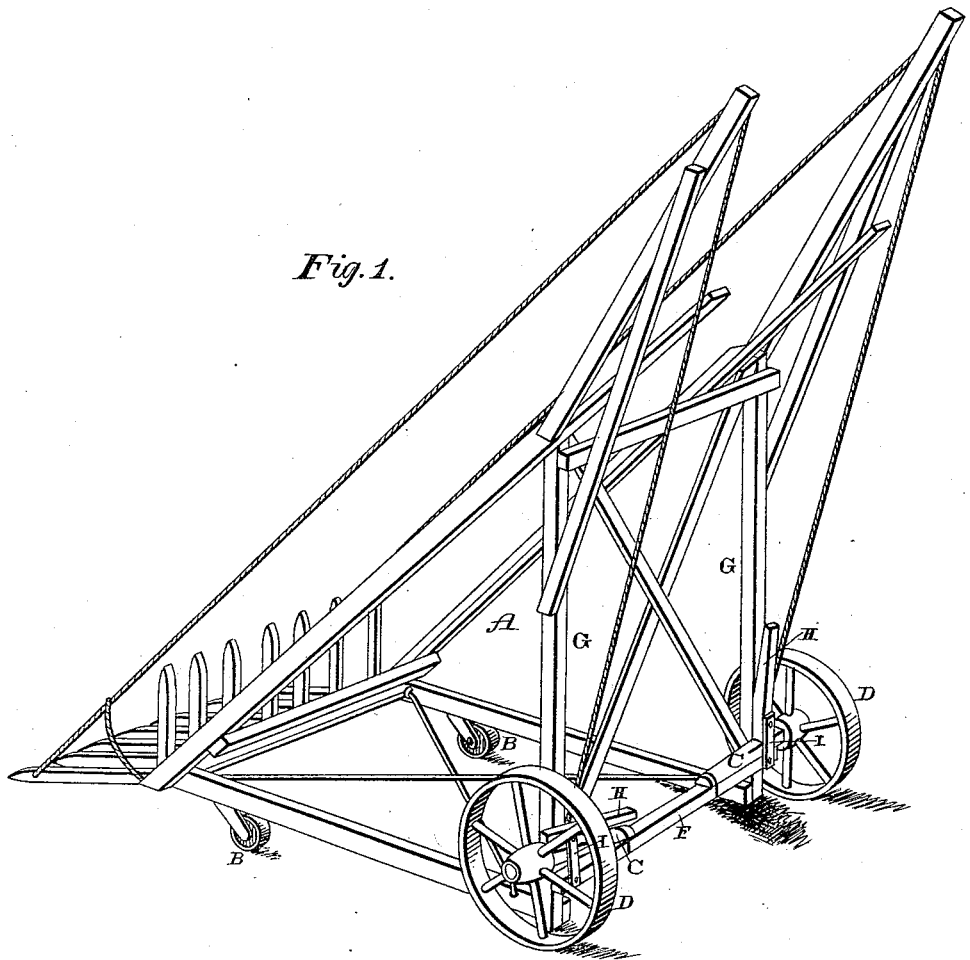

(No Model.)

W. KLINKER.
HAY STACKER.

No. 451,766. Patented May 5, 1891.

Witnesses:
E. P. Ellis
J. M. Hecht

Inventor
W. Klinker
per
Lehmann & Patterson
attys

UNITED STATES PATENT OFFICE.

WESLEY KLINKER, OF UNION MILLS, IOWA.

HAY-STACKER.

SPECIFICATION forming part of Letters Patent No. 451,766, dated May 5, 1891.

Application filed December 6, 1890. Serial No. 373,774. (No model.)

*To all whom it may concern:*

Be it known that I, WESLEY KLINKER, of Union Mills, in the county of Mahaska and State of Iowa, have invented certain new and useful Improvements in Hay-Stackers; and I do hereby declare the following to be a full, clear, and exact description of the invention, such as will enable others skilled in the art to which it pertains to make and use it, reference being had to the accompanying drawings, which form part of this specification.

My invention relates to an improvement in hay-stackers; and it consists in the combination and construction of parts which will be fully described hereinafter, and pointed out in the claims.

The objects of my invention are to apply wheels to the stacker, so that it can be readily moved from place to place, and to connect the large wheels to the frame of the stacker in such a manner that the frame can be raised from the ground for transportation, or be lowered, so as to rest solidly upon the ground while in operation, and so as to raise the rear ends of the teeth of the device by which the hay is lifted, so that the teeth of the horse hay-rake can pass under the front end of the stacker.

Figure 1 is a perspective of a hay-stacker which embodies my invention, and showing the frame raised. Fig. 2 is a rear detached view showing the frame lowered at its rear corners.

A represents a hay-stacker of any desired shape, size, or construction that may be preferred, and which is mounted at its front corners upon the small pivoted wheels B, which freely swing around, so as to move in any desired direction. At the rear corners of the frame are loosely secured at their inner ends the two short spindles or axles C, upon which the large wheels D are placed. These axles have their inner ends loosely fastened to the top of the lower cross-bar F of the stacker-frame, and they project beyond the rear sides of the uprights G, as shown. Pivoted upon the uprights G are the two levers H, which have their lower ends to bear tightly against the tops of the short axles C when the levers are raised into a vertical position, and which levers, when turned into a horizontal position, allow the rear end of the stacker-frame to sink so as to rest solidly upon the ground and at the same time raise the front end of the stacker-frame sufficiently to allow the teeth of the horse hay-rake to extend freely under the front end of the stacker, and thus enable the hay to be transferred from the horse hay-rake to the device upon the stacker, by which the hay is lifted more easily than could otherwise be done. Extending from the pivotal bolts upon which the levers H turn, and which extend through the uprights G, down to and connecting with the cross-bar F, are the strips or plates I. The short axles being held between the top of the cross-bar F and the levers H, the frame of the stacker can be raised and lowered at the will of the operator by simply moving the levers H from a horizontal to a vertical position or from vertical to horizontal position. When the levers are raised into vertical positions, their lower ends act as cams to raise the rear corners of the frame in contact with the lower sides of the axles C, and when the levers are moved into horizontal positions the weight of the frame causes it to settle until the upper sides of the axles are forced up against the under sides of the levers, the plates I being proportionate in length, so as to allow the frame the necessary amount of movement. When the frame has its rear corners resting solidly upon the ground, it is solidly anchored in place, and there is no danger of its being moved while in operation at the same time that its front corners are tilted up, as described.

Having thus described my invention, I claim—

1. In a hay-stacker, the frame having rear vertical uprights, a horizontal cross-bar connecting the uprights near their lower ends, short axles loosely connected at their inner ends to the cross-bar and having wheels on their outer ends, and levers pivoted between their ends to the uprights above the axles and outside of their connection with the said cross-bar, the lower ends of the levers adapted to engage the axles, the parts combined to operate substantially as shown.

2. In a hay-stacker, the frame, axles pivotally connected at their inner ends to the frame and having wheels on their outer ends, the straps connected at their lower ends to the frame outside of the axles, and the levers pivotally connected between their ends between the upper ends of the said straps and the frame, substantially as specified.

In testimony whereof I affix my signature in presence of two witnesses.

WESLEY KLINKER.

Witnesses:
W. T. HAMMOND,
JOHN BUSBY.